J. C. SHELLER.
PERMUTATION LOCK.
APPLICATION FILED FEB. 10, 1921.

1,430,195.

Patented Sept. 26, 1922.
6 SHEETS—SHEET 1.

INVENTOR.
John C. Sheller
BY Young & Young
ATTORNEYS.

J. C. SHELLER.
PERMUTATION LOCK.
APPLICATION FILED FEB. 10, 1921.

1,430,195.

Patented Sept. 26, 1922.
6 SHEETS—SHEET 2.

INVENTOR.
John C. Sheller
BY Young & Young
ATTORNEYS.

J. C. SHELLER.
PERMUTATION LOCK.
APPLICATION FILED FEB. 10, 1921.
1,430,195.
Patented Sept. 26, 1922.
6 SHEETS—SHEET 3.
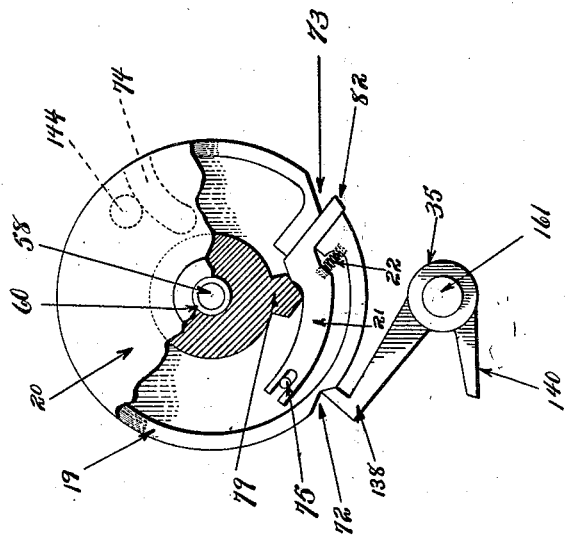
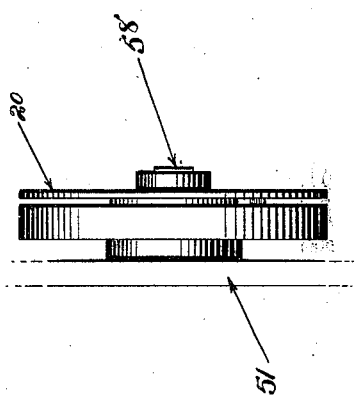

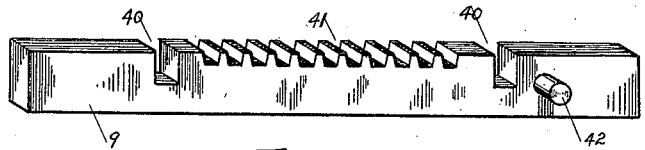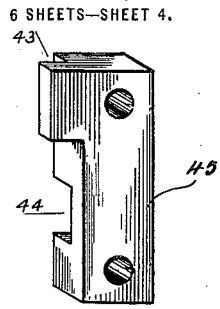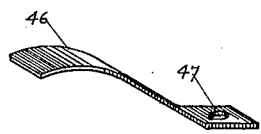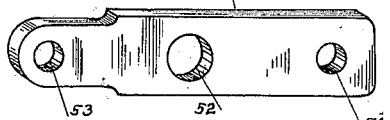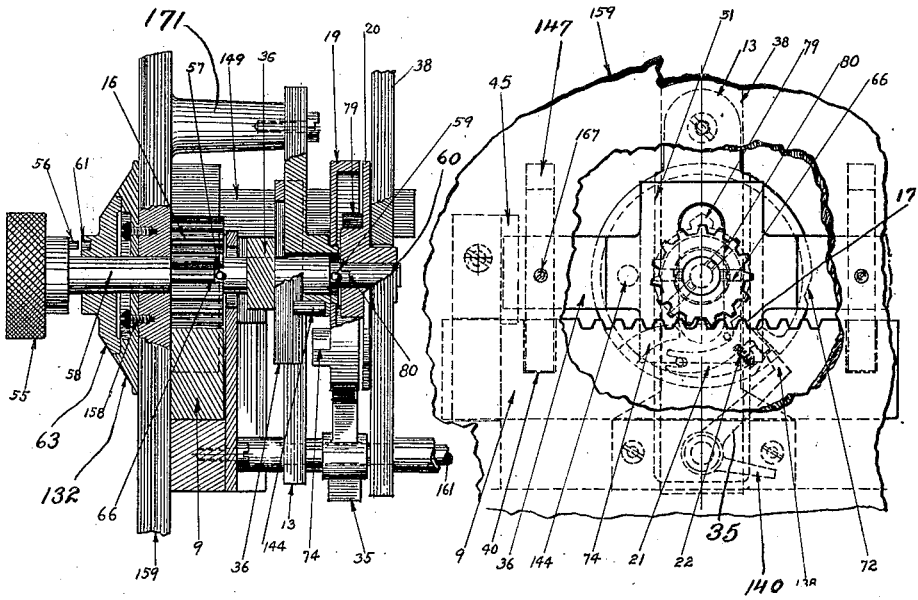

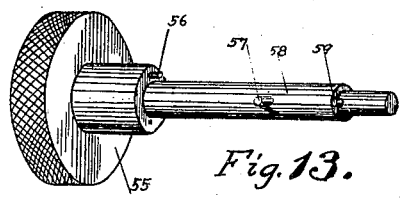
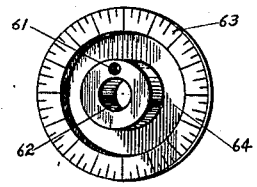
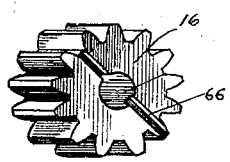
Fig. 13.    Fig. 14.    Fig. 15.
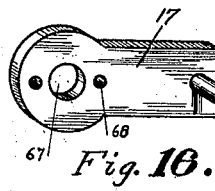
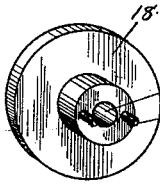
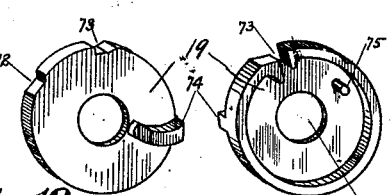
Fig. 16.    Fig. 17.    Fig. 18.    Fig. 19.
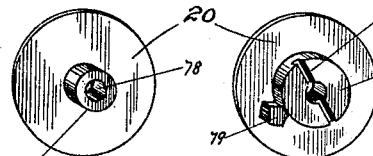
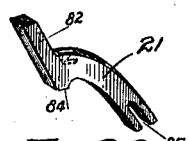
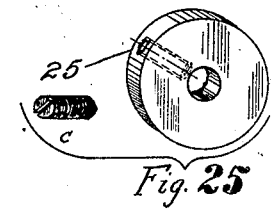
Fig. 20.    Fig. 21.    Fig. 22.    Fig. 25
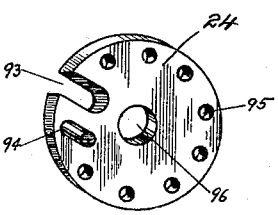
Fig. 23    Fig. 24
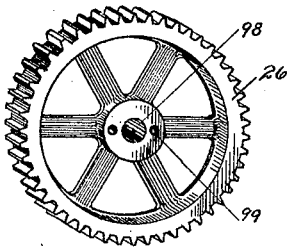
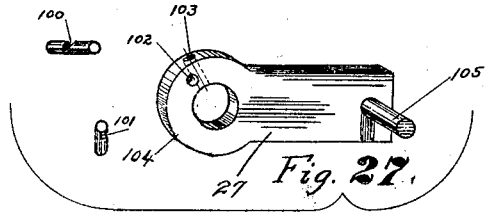
Fig. 26    Fig. 27
INVENTOR.
John C. Sheller
BY Young & Young
ATTORNEYS.

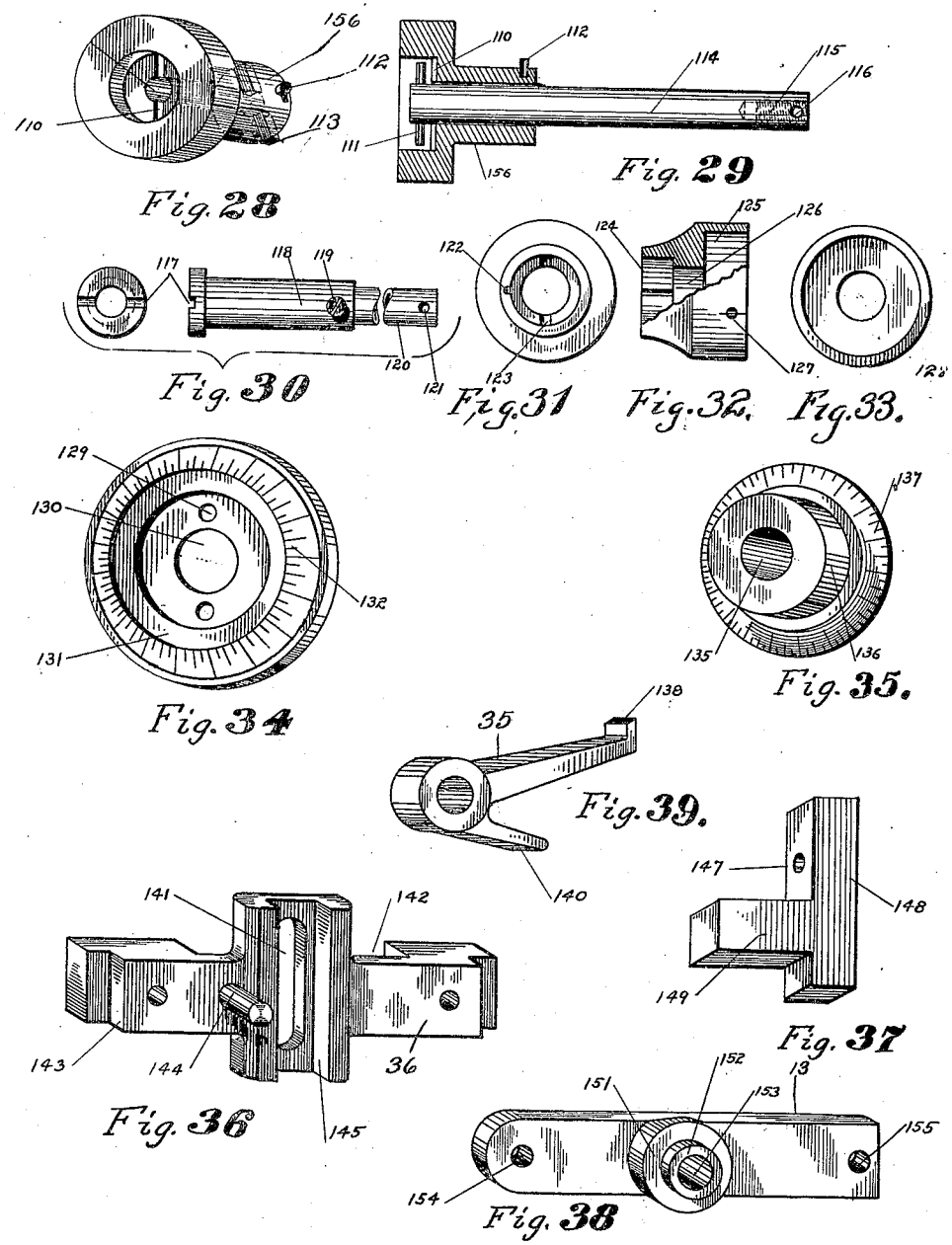

Patented Sept. 26, 1922.

1,430,195

UNITED STATES PATENT OFFICE.

JOHN C. SHELLER, OF JANESVILLE, WISCONSIN, ASSIGNOR TO ELIAS SEGAL AND LEON BORUSZAK, BOTH OF JANESVILLE, WISCONSIN.

PERMUTATION LOCK.

Application filed February 10, 1921. Serial No. 443,907.

*To all whom it may concern:*

Be it known that I, JOHN C. SHELLER, a citizen of the United States, and resident of Janesville, in the county of Rock and State of Wisconsin, have invented certain new and useful Improvements in Permutation Locks; and I do hereby declare that the following is a full, clear, and exact description thereof.

My invention relates to improvements in permutation locks of the type in which a series of notched tumbler disks are provided, the notches of which must be brought into alignment in the path of the fence before the same can be raised to release the bolt.

With many of the permutation locks heretofore made in which a tumbler was set at each rotation of the knob, expert safe burglars could by paring the finger nails to the quick or by removing the cuticle from the ends of the fingers render them so extremely sensitive that they could feel the click when the knob reached the proper position corresponding with the combination of the lock.

One of the objects of the present invention is to construct a permutation lock in which there shall be no click during the operation of unlocking or anything to indicate when the correct position is reached except the dial on which the combination is read.

Another object of the invention is to provide two series of tumbler disks, each one of which is set for a different combination, one of the advantages of this structure being that one man may be acquainted with one of the combinations, and another man acquainted with the other combination, so that the presence of both men may be necessary to unlock the safe.

A more specific object is to provide a lock with two series of tumbler disks, each of which may be operated selectively by the same knob.

A further object of the invention is to provide a structure in which the fence may be raised and the bolt drawn by the manipulation of a single knob.

Other objects and advantages of my invention will be apparent as the description proceeds, and it will be understood that the invention is not limited to the precise structural details shown and described but include all modifications and equivalents that fall within the scope of the appended claims.

In describing the invention reference will be had to the accompanying drawings, in which:

Figure 5 is a rear elevation partly in section of the mechanism for raising the fence and drawing the bolt.

Figure 6 is a side elevation looking towards the right in Figure 5.

Figure 7 is a vertical sectional view through the fence and bolt operating mechanism.

Figure 8 is a fragmentary front elevation of the door with parts broken away to show the bolt operating mechanism.

Figure 9 is a detail view of the bolt.

Figure 10 is a perspective view of a leaf spring which acts on the dog which positions the bolt and fence actuating mechanism.

Figure 11 is a detail perspective view of the keeper in which the bolt and fence slide.

Figure 12 is a detailed perspective view of the plate in which the rear end of the bolt and fence operating mechanism is mounted.

Figures 13 to 15 are detailed perspective views of elements of the bolt and fence actuating mechanism.

Figures 16 and 17 are detailed views of elements of the tumbler operating mechanism.

Figures 18 to 22 are detailed perspective views of other elements of the bolt and fence actuating mechanism.

Figures 23 to 33 are detailed perspective views of other elements of the tumbler operating mechanism.

Figures 34 and 35 are detailed perspective views of the dials for the tumbler operating mechanism.

Figure 36 is a detailed perspective view of the fence.

Figure 37 is a detailed perspective view of the lug member attached to the fence for engaging the bolt and tumbler disks.

Figure 38 is a perspective detailed view of the plate in which the front end of the bolt and fence actuating mechanism is mounted, and Figure 39 is a detailed perspective view of the dog which holds the bolt and fence actuating mechanism in position.

Figure 1:
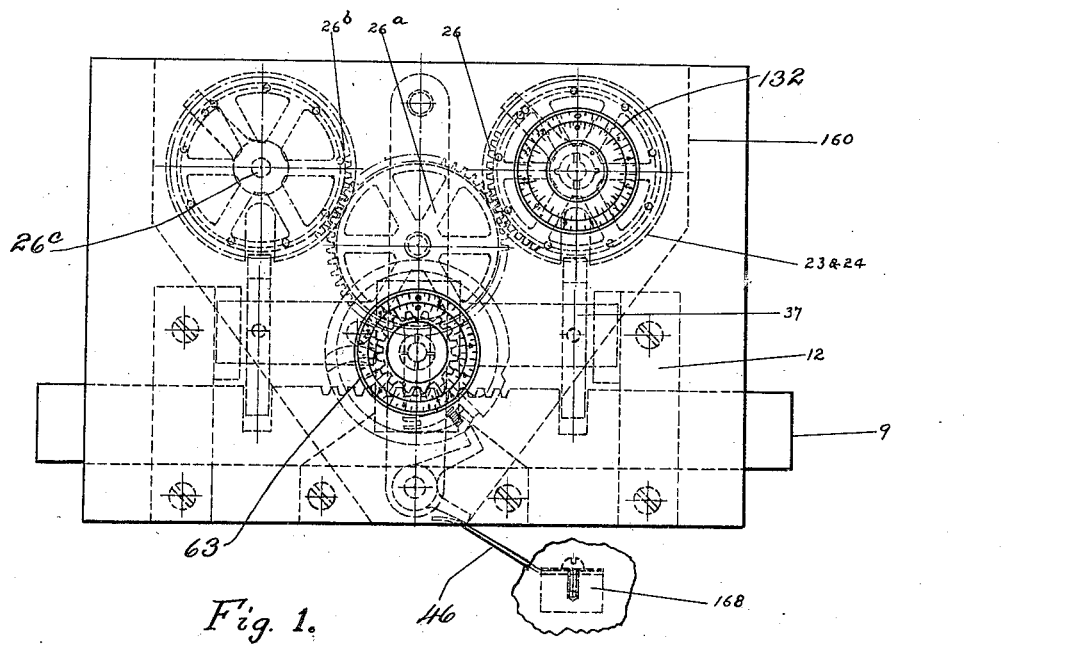
Figure 1 is a front elevation of a safe door with my invention applied thereto.
Figure 2:
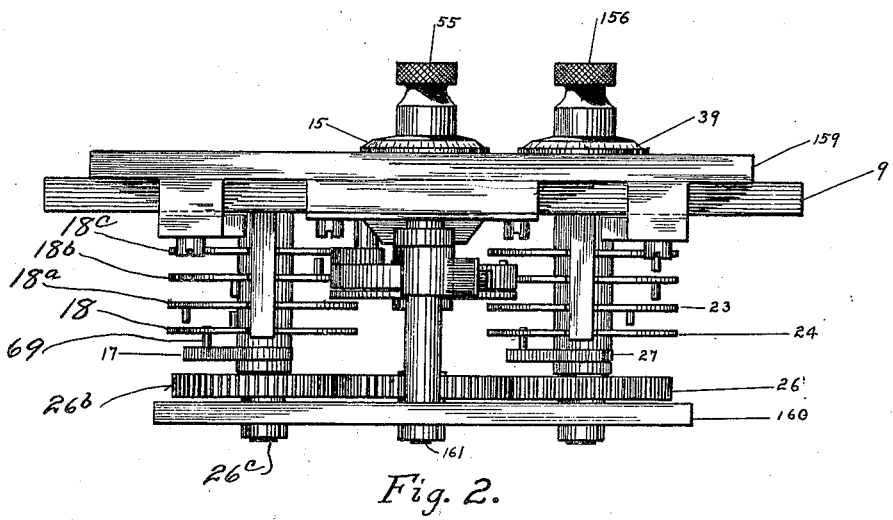
Figure 2 is a bottom plan view showing the mechanism for setting the tumbler disks, and for operating the bolt.
Figure 3:
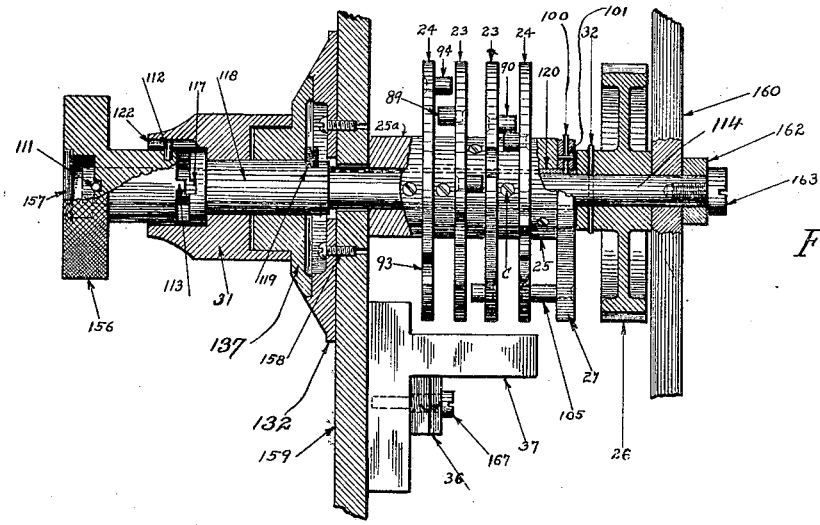
Figure 3 is a vertical sectional view through the primary tumbler disk operating mechanism.
Figure 4:
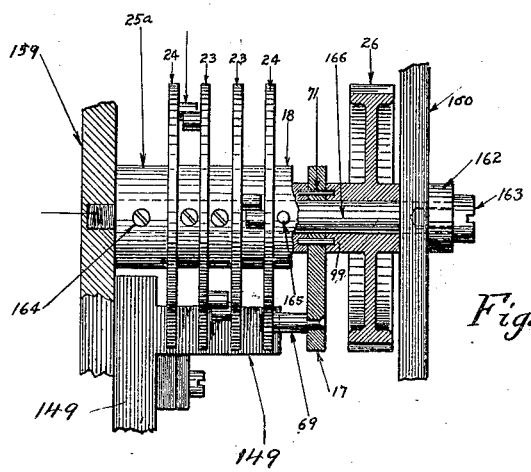
Figure 4 is a vertical sectional view through the secondary tumbler disk operating mechanism.

Referring now to the drawings in detail, the numeral 159 indicates the front plate of a safe door and 160 is the rear housing plate for the lock which may also be the inside plate of the door. Extending through these plates transversely is an arbor 114, the inner end of which is secured by the washer 162 and the screw 163. On the end of this arbor adjacent the plate 160 is mounted the spur gear 26 which is secured to the arbor by the pin 32. A sleeve 120 is mounted on the arbor 114 and extends outwardly through the plate 159. The sleeve is also provided outside the plate 159, with a thimble 118 which is secured thereto by a set screw 119. The thimble is provided with a slotted head 117, and also carries a dial 137 which is fixed to the thimble by means of a hub 136 provided with the opening 135 which closely engages the thimble.

Mounted on the plate 159 between the dial 137 and the plate is a second dial 132 shown in detail in Figure 34. This dial is provided with an opening 130 to provide clearance for the sleeve and thimble, and is provided with holes 129 by which it is secured to the plate 159 by means of the set screw 158. The dial 132 is also provided with an annular channel 131, which fits over the periphery of the dial 137. Loosely journaled on the thimble 118 is a member 31 which is shown in detail in Figures 31, 32 and 33. This member is provided with a recess 125 which fits over the hub 136 of the dial 137. The central opening 126 through the member 31 loosely receives the thimble 118 and the other portion 124 extends beyond the slotted head 117 and is provided with a longitudinal groove 122. This groove slidably receives the pin 112, which is carried by the hub of the knob 156. The knob 156 is provided with a recess in its head, into which extends the end of the arbor 114, which is provided with a pin 111, which may engage in the slot 110, as shown in Figure 29, when the knob is moved to its outermost position. The recess is covered by a metal disk or the like 157.

Extending inwardly from the hub portion of the knob, are the lugs 113 which engage with the slotted head 117, when the knob is moved to its innermost position. Mounted on the sleeve 120, are a series of tumbler disks 23 and 24. The outermost disks 24 are provided, as shown in Figure 24, with a central opening 96 for receiving the sleeve and with the slot 93.

Near the periphery of the disk is a series of holes 95 in one of which is secured a pin 94. The inner disks 23 are provided, as shown in Figure 23, with a central opening 92, a notch 88 and a series of openings 91 near the periphery, in one of which is secured a pin 90 extending on one side of the disk, and in another opening is secured a pin 89 extending on the other side of the disk. It will, of course, be understood that a plurality of holes is provided in order that different combinations may be set up. The disks 23 and 24 are separated by spacers 25 which are secured to the sleeve 120 by set screws c. In the present instance it will be noted that the spacer between the end plate 159 and the outermost disk is wider than the others as shown at 25ª. Between the innermost spacer 25 and the hub of the spur gear 26 is mounted an arm 27, which is shown in detail in Figure 27. This arm is provided with an opening 104 for receiving the sleeve 120, and is provided with two small holes 102 and 103, in which are inserted the pins 100 and 101 for retaining the arm in fixed position on the sleeve. The pin 105 is provided in the end of the arm 27, and permanently connects the same to the innermost disk 24.

When the knob 156 is pushed inwardly so that the lugs 113 engage the slotted head 117, the sleeve may be rotated by the rotation of the knob. The outermost tumbler disk is first set according to the combination which is read on the dial 132. Then the second disk is set, and so on until the entire series of disks are set so that the slots 88 and 93 will be left in their lowermost position in the path of the fence which is to be raised to release the bolt. When the disks 23 and 24 are properly set, the knob is moved outwardly through neutral position into the position in which the slot 110 is in engagement with the pin 111. Then by rotation of the knob, the arbor 114 and spur gear 26 will be rotated while the sleeve 120 and the disks 23 and 24 remain stationary.

Rotation is imparted by the spur gear 26 through the intermediate gear 26ª to the spur gear 26ᵇ which is mounted on the arbor 26ᶜ by means of which rotary motion is imparted to the arm 17 which is shown in detail in Figure 16. This arm 17 is provided with the bearing 67, which is fixed on the arbor 26ᶜ. Holes 68 are provided which receive the pins 71 as shown in Figure 17, which extend from the hub of the disk 18, which is provided with the bearing 70 which loosely receives the shaft 26ᶜ. The disks 18, 18ᵃ, 18ᵇ and 18ᶜ are set in the same manner as the disks 23 and 24. The combination for setting these secondary disks will, however, be read by the position of the member 31 with respect to the dial 137.

When both primary and secondary sets of disks have been set all of the notches will be in their lowermost position in alignment with the arm 149 which projects from the member 147 which is shown in detail in Figure 37. This member 147 is carried by the fence 36 which is shown in detail in Figure 36. The ends of the fence are mounted to slide up and down in the keepers 45 as shown in Figures 8 and 11. A channel 145 is provided in the fence to receive the plate 13 which is secured in fixed position with relation to the door as shown in Figure 7, the lowermost end being carried by the transverse pin 161 and the upper end carried by the projecting stud 171. Another vertical plate 38 is similarly fixed to the door in the rear of the plate 13. These plates are provided with the bearings 52 and 153 as shown in Figures 12 and 38 for the reception of the spindle 58 by which the fence and bolt are operated.

Holes are provided at the ends of the members 13 and 38 as indicated at 53, 54, 154 and 155 for the purpose of securing them to the door. The fence is provided with a projecting pin 144 which is engaged by the rib 74 as indicated in Figure 5 to raise the fence out of engagement with the notches 40 in the bolt 9 and into engagement with the notches in the disks.

The structure of the mechanism for operating the fence and drawing the bolt will now be described. The spindle 58 is mounted for rotative movement in the plate 159 and the plate 13 hereinbefore referred to. Centered on this spindle is a dial 132 shown in detail in Figure 34, and this dial is provided with holes 129 through which the screws 158 are inserted to secure the dial to the plate 159. The dial is provided with the central opening 130 through which the spindle passes, and with an annular channel 131 which receives the dial 63. The dial 63 is provided with a recess 61, which receives a pin 56 which projects from the hub of the knob 55 carried by the end of the spindle when the spindle is shifted to its innermost position.

A disk 19 is carried on the boss 152, which projects from the hub 151 on the plate 13. Another disc 20 is located adjacent the disc 19, the hub of the disc 20 being provided with a boss journaled in the plate 38 and within the hub is a bushing 60, which receives the innermost end of the spindle 58.

The spindle is also provided at its inner end with a pin 59, which when the spindle is pushed inwardly, engages in the recess 80 formed in the bushing 60 in which the inner end of the spindle is carried. The disc 19 is formed with a peripheral flange having a slot 73 therein, in which the member 21 is slidable. The member 21 is formed with a slot 85 at one end, which receives the pin 75 which is carried by the disc and the other end 82 rides in the slot 73.

The member 21 is normally held in its innermost position by the spring 22. The disc 20 may be keyed to the spindle 58, while the disc 19 is loosely mounted on the boss 152. To the inner end of the disc 20 is attached a pointed arm 79, which is adapted to ride up on the member 21 at a certain point in the operation of the device and force said member outwardly, as shown in Figure 5. Upon further rotation of the disc 20 and arm 79, the disc 19 is also rotated. The disc 19 is provided on its front side with a rib 74 which is adapted to engage a pin 144 on the fence to raise the same.

A dog 35 is journaled on the shaft 161 and is provided with a heel 140, which is under the influence of the spring 46, to yieldingly hold the toe 138 of the dog in engagement with the peripheral flange on the disk 19.

After the tumbler disks have all been set with their slots in proper position to receive the fence, the knob 55 is pushed inwardly, the pin 56 entering the recess 61 and the pin 59 entering the recess 80 in the bushing 60, which carries the disk 20. This locks the disk 20 to the knob spindle. The knob is then rotated to the right or in a clockwise direction. The disk is carried therewith until the toe 138 of the dog 35 falls into the notch 73. The rotation of the disk 19 then ceases until the tooth 79 rides up on the member 21, forcing the same to its outermost position, and forcing the toe 138 out of the notch 73. The disk 20 can not rotate further unless the disk 19 rotates with it. Upon continuing the rotation, the rib 74 engages the pin 144 and raises the fence. At this period in the operation, the toe 138 falls into the notch 72. This holds the disk 19 against accidental rotary movement, while the bolt is being drawn and the engagement of the member 21 with the arm 79 holds the disk 20 also against accidental rotation.

This position is indicated on the dial 63 and is shown in Figure 5. The knob 55 is now pulled outwardly, the pin 57 being now opposite the notch 66 will engage the same as shown in Figure 7, and upon rotation of the knob to the left, the bolt 9 will be withdrawn and the door will be free to swing open. To lock the door again, it is obvious that the operation is the reverse of that described above.

Having thus described the structure and operation of my improved lock, I claim:

1. In a permutation lock, a rotatable arbor having a sleeve mounted thereon, said sleeve carrying a series of notched tumbler disks, a second arbor geared to the first and having a second series of notched tumbler disks mounted thereon, means operable by the rotation of said sleeves for bringing the notches of the first series of disks into alignment, means operable by the rotation of said arbors for bringing the notches of the second series of disks into alignment, a knob slidably mounted on said first named arbor, means for clutching said knob with the arbor when slid outwardly, and means for clutching it with the sleeve when moved inwardly.

2. In a permutation lock, two rotatable arbors, a series of notched tumbler disks mounted on each, a slidable bolt having a notch therein, a fence slidable in a straight line at right angles to the direction of movement of the bolt and normally held by said tumbler disks in engagement with the notch in said bolt, means for bringing the tumbler notches of both series into alignment in the path of said fence, and means for moving the fence out of the notch in the bolt and into the notches in said tumbler disks.

3. In a permutation lock, two rotatable arbors, a series of notched tumbler disks mounted on each, a slidable bolt having a notch therein, a fence slidable in a straight line at right angles to the direction of movement of the bolt and normally held by said tumbler disk in engagement with the notch in said bolt, a knob on the end of one of said arbors, said knob being operable to bring the tumbler notches of both series into alignment in the path of said fence, and means for moving the fence out of the notch in the bolt, and into the notches of said tumbler disks.

4. In a permutation lock, two rotatable arbors, a series of notched tumbler disks mounted on each, a slidable bolt having a notch therein, a slidable fence normally held by said tumbler disks in engagement with the notch in said plate, means for bringing the tumbler disks of both series into alignment in the path of said fence, a rack formed on said bolt, a pinion in constant engagement with said rack, a spindle on which said pinion is rotatably mounted, rotatable means carried by said spindle for moving the fence out of the notch in the bolt and into the notches in said tumbler disks, and means for clutching said spindle with the pinion for the fence operating means selectively.

5. In a permutation lock, two rotatable arbors, a series of notched tumbler disks mounted on each, a slidable bolt having a notch therein, a slidable fence normally held by said tumbler disks in engagement with the notch of said bolt, a knob on the end of one of said arbors, said knob being operable to bring the tumbler notches of both series into alignment in the path of said fence, a rack formed on said bolt, a pinion in constant engagement with said rack, a spindle on which said pinion is rotatably mounted, rotatable means carried by said spindle for moving the fence out of the notch in the bolt and into the notch in said tumbler disks, and means for clutching said spindle with the pinion or the fence operating means selectively.

6. In a permutation lock, a rotatable arbor having a sleeve mounted thereon, said sleeve carrying a series of notched tumbler disks, a second arbor geared to the first and having a second series of notched tumbler disks mounted thereon, a slidable bolt having a notch therein, a slidable fence normally held by said tumbler disks in engagement with the notch in said bolt, means operable by the rotation of said sleeve for bringing the notches of the first series of disks into alignment in the path of said fence, means operable by the rotation of said arbors for bringing the notches of the second series of disks into alignment in the path of said fence, a knob slidably mounted on said first named arbor, means for clutching said knob with the arbor when slid outwardly and means for clutching it with the sleeve when moved inwardly.

7. In a permutation lock, a rotatable arbor having a sleeve mounted thereon, said sleeve carrying a series of notched tumbler disks, a second arbor geared to the first and having a second series of notched tumbler disks mounted thereon, a slidable bolt having a notch therein, a fence slidable in a straight line at right angles to the direction of movement of the bolt and normally held by said tumbler disks in engagement with the notch in said bolt, means operable by the rotation of said sleeve for bringing the notches of the first series of disks into alignment in the path of said fence, means operable by the rotation of said arbors for bringing the notches of the second series of disks into alignment in the path of said fence, a knob mounted on said first named arbor, means for clutching said knob with the arbor or its sleeve selectively, to set the notches, and means for subsequently moving the fence out of the notch in the bolt and into the notches in the tumbler disks.

8. In a permutation lock, a rotatable arbor having a sleeve mounted thereon, said sleeve carrying a series of notched tumbler disks, a second arbor geared to the first and having a second series of notched tumbler disks mounted thereon, a slidable bolt having a notch therein, a slidable fence normally held by said tumbler disks in engagement with the notch in said bolt, means operable by the rotation of said arbors for bringing the notches of the second series of disks into alignment in the path of said fence, a knob mounted on said first named arbor, means for clutching said knob with the arbor or its sleeve selectively, to set the notches, a rack formed on said bolt, a pinion in constant engagement with said rack, a spindle on which said pinion is rotatably mounted, rotatable means carried by said spindle for moving the fence out of the notch in the bolt and into the notches in said tumbler disks, and means for clutching said spindle with the pinion or the fence operating means selectively.

In testimony that I claim the foregoing I have hereunto set my hand at Milwaukee, in the county of Milwaukee and State of Wisconsin.

JOHN C. SHELLER.